J. RAU.
GLASS BLOWING MACHINE.
APPLICATION FILED OCT. 13, 1911.
1,070,530.
Patented Aug. 19, 1913.
5 SHEETS—SHEET 2.
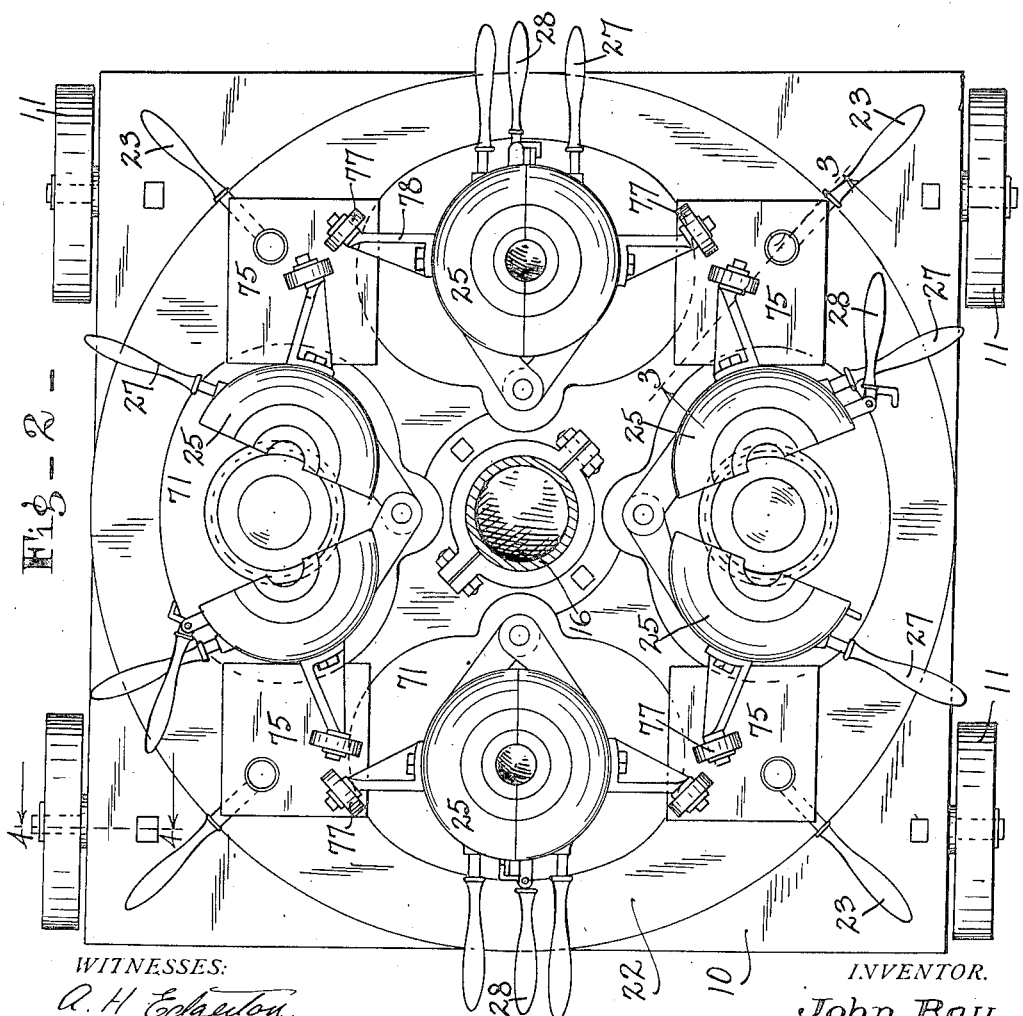
WITNESSES:
A. H. Edgerton.
O. M. McLaughlin.
INVENTOR.
John Rau
BY
ATTORNEY.

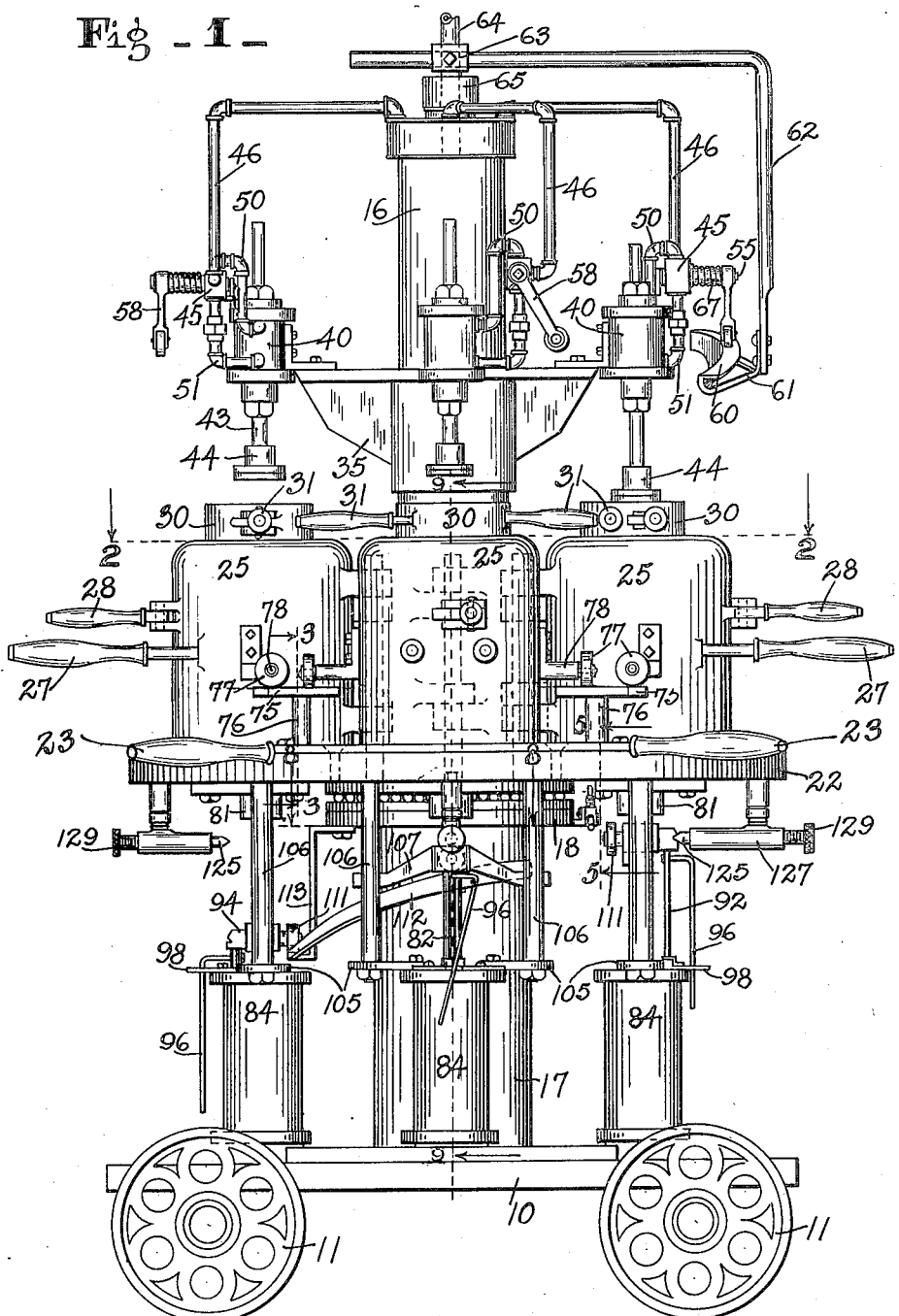

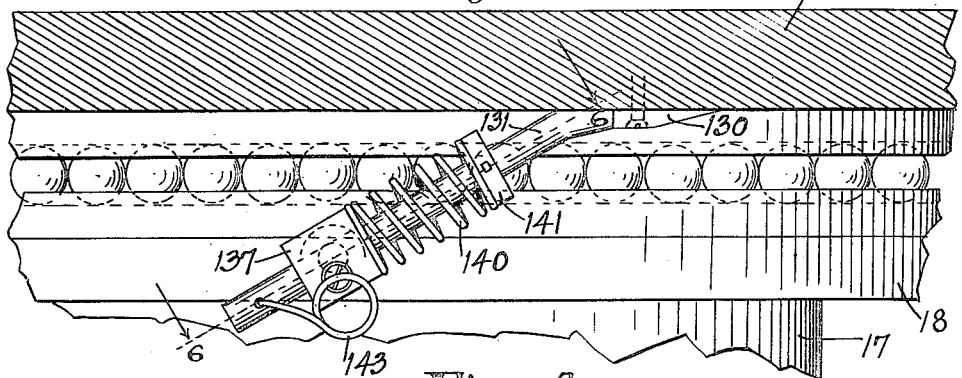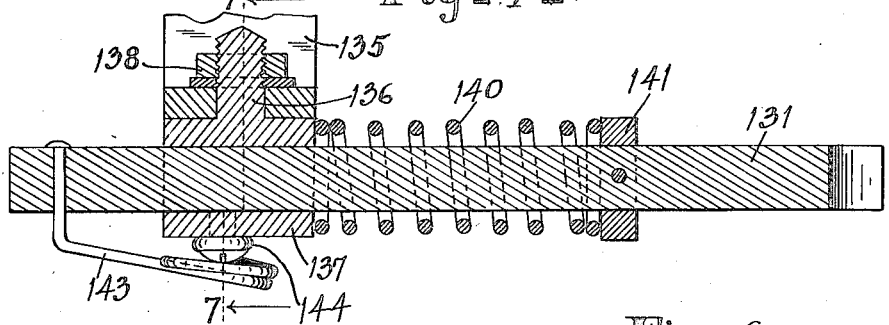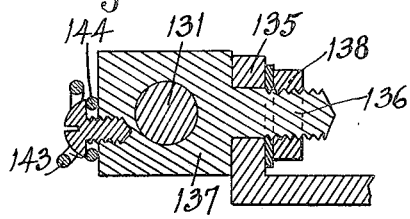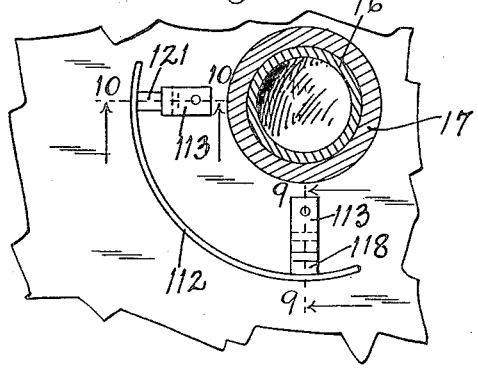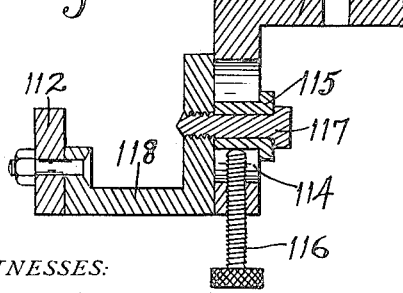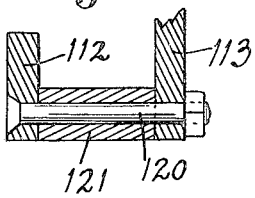

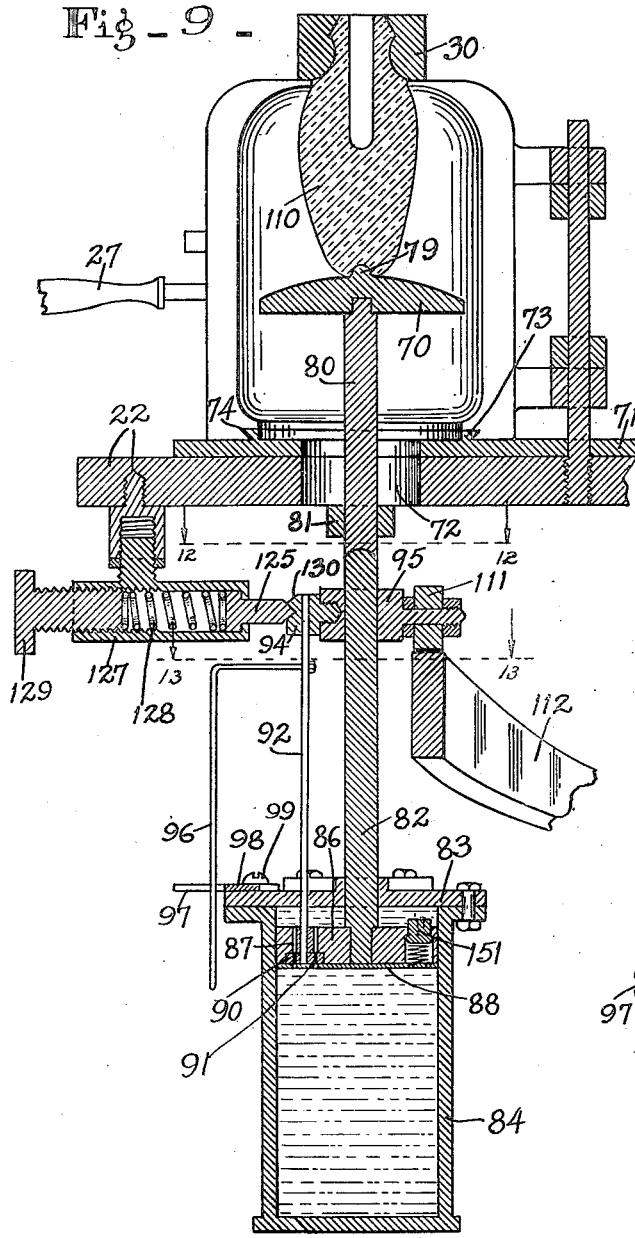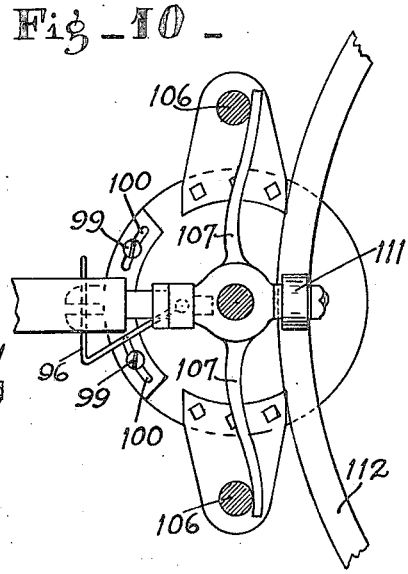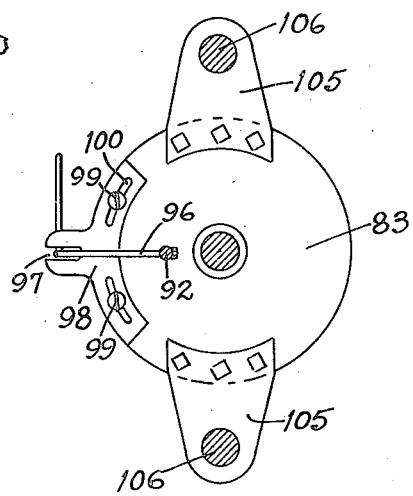

J. RAU.
GLASS BLOWING MACHINE.
APPLICATION FILED OCT. 13, 1911.
1,070,530.
Patented Aug. 19, 1913.
5 SHEETS—SHEET 5.
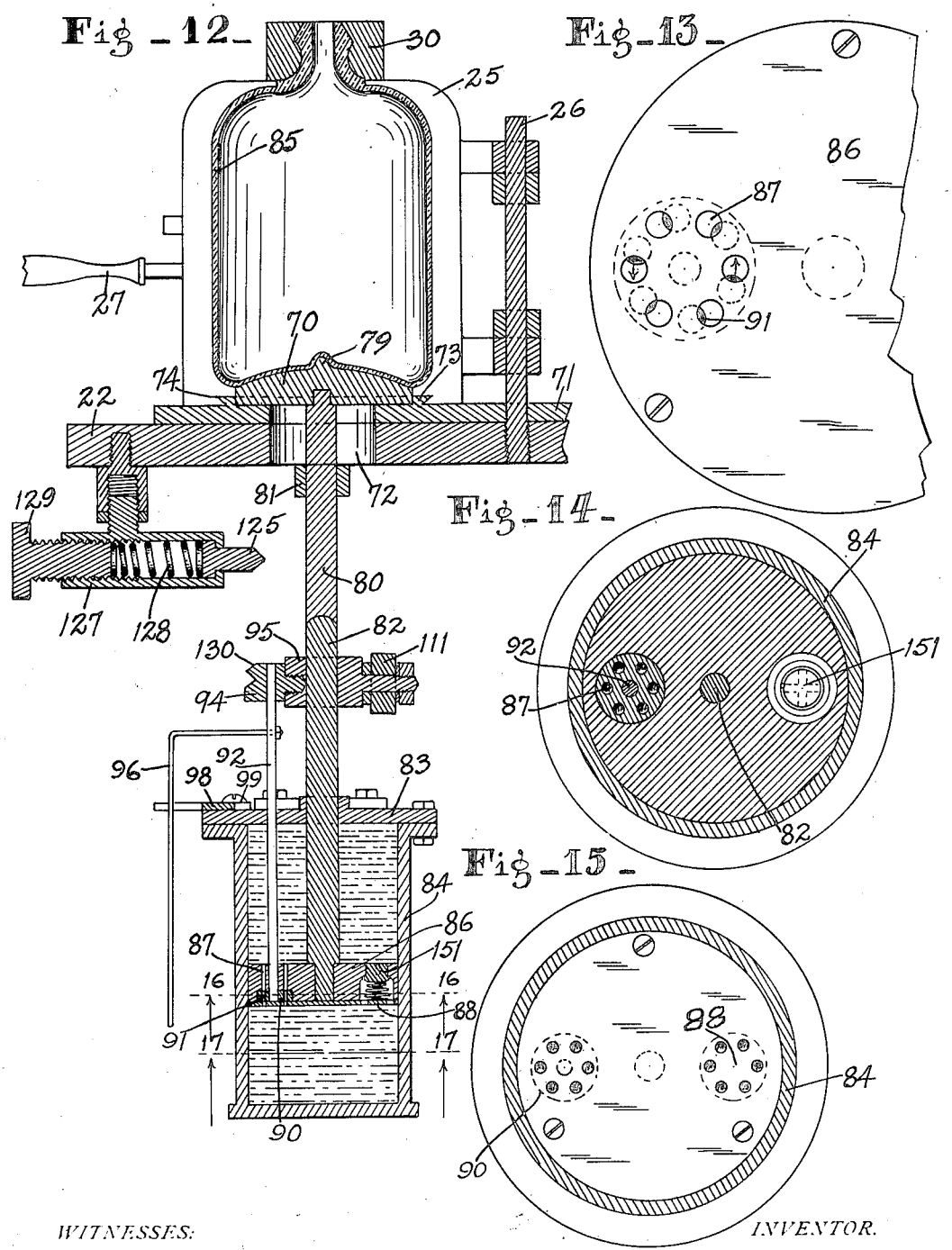
WITNESSES:
A. H. Edgerton
O. M. McLaughlin
INVENTOR.
John Rau
BY
V. H. Lockwood
ATTORNEY.

UNITED STATES PATENT OFFICE.

JOHN RAU, OF INDIANAPOLIS, INDIANA.

GLASS-BLOWING MACHINE.

1,070,530.   Specification of Letters Patent.   Patented Aug. 19, 1913.

Application filed October 13, 1911.  Serial No. 654,536.

*To all whom it may concern:*

Be it known that I, JOHN RAU, of Indianapolis, county of Marion, and State of Indiana, have invented a certain useful Glass-Blowing Machine; and I do hereby declare that the following is a full, clear, and exact description thereof, reference being had to the accompanying drawings.

The object of this invention is to provide an improved construction of a machine adapted to blow very large hollow glassware, say jars, demijohns and carboys of five, ten or fifteen gallons capacity. Heretofore, so far as I am aware, no glass blowing machine has ever been made or used capable of making glassware of the sort having a capacity of more than one gallon. As the size of the hollow glassware increases, the difficulties of its proper blowing and formation greatly multiply, and it is to overcome these difficulties that the improvements shown in the drawings attached hereto and described and claimed in the specification following have been made.

In the drawings Figure 1 is an elevation of said glass blowing machine. Fig. 2 is a horizontal section on the line 2—2 of Fig. 1. Fig. 3 is a section on the line 5—5 of Fig. 1, but on a much larger scale. Fig. 4 is a section on the line 6—6 of Fig. 3 but on a larger scale. Fig. 5 is a section on the line 7—7 of Fig. 4. Fig. 6 is a horizontal section through a part of the machine on the line 8—8 of Fig. 1. Fig. 7 is a section on the line 9—9 of Fig. 6. Fig. 8 is a section on the line 10—10 of Fig. 6. Fig. 9 is a section through a portion of the machine on the line 11—11 of Fig. 1, showing the position of the parts at the time when the blowing commences. Fig. 10 is a section on the line 12—12 of Fig. 9. Fig. 11 is a section on the line 13—13 of Fig. 9 with the track omitted. Fig. 12 is the same as Fig. 9 showing the position of the parts after the bottle has been blown. Fig. 13 is a bottom view of a portion of the piston shown in Fig. 12 on a large scale, the remainder of said piston being broken away. Fig. 14 is a section on the line 16—16 of Fig. 12. Fig. 15 is a section on the line 17—17 of Fig. 12.

In detail, there is shown herein a platform 10 carried by four wheels 11 and which has a tubular stand 17 in which a tubular column 16 is mounted, resting upon the base so as to be rotatable. Upon the tubular stand 17 there is secured a head 18 upon which a blow mold table 22 is supported and mounted and carried by suitable ball bearings. This table has handles 23 projecting radially from it whereby it is revolved by hand.

The tubular column 16 is adapted to receive and hold compressed air used for blowing, and upon that column above the blow mold 22 a spider 35 is secured, the arms of which carry air cylinders 40 for the blow-heads 44. The cylinders 40 are constructed in the usual manner for moving and supplying air through the blow-heads which are mounted on the lower ends of the tubes 43 leading from pistons in the cylinders 40. The pistons in the cylinders 40 are actuated by compressed air entering the cylinder through the pipes 50 and 51, the air through the latter lifting the blow-head and the air through the former tending to force it downward. These tubes 50 and 51 lead from the valve box 45, which is in communication with the upper end of the compressed air column 16 by pipe 46. The valve in the valve box is not here shown, but it is actuated so as to close the pipe 51 and open the pipe 50 by a stationary track 60 engaging the lower end of the rocker arm 58 on the stem or shaft 55 of the valve, as the machine revolves and the arm 58 comes in engagement with the track 60 and rides upon the same, for said track 60 is inclined upwardly. The spring 67 around the valve stem 55 returns the valve and stem to their normal position, which shuts off the pipe 50 and opens up the pipe 51, whereby the blow-head is elevated to its normal position. The inclined track 60 is supported on a bracket 61 secured to a bent rod 62, which is clamped by the clamp 63 to a stationary pipe 64 leading from some suitable source of compressed air into the upper end of the compressed air column 16 through the stuffing box 65.

Under the blow-heads and in alinement with them the blow molds 25 are located upon the blow mold table 22 upon and in connection with which lift-overs 30 of the usual type may be employed, said lift-overs having handles 31. The blow molds are formed of two halves hinged together at 26 and having handles 27 and a lock handle 28. The upper end of the mold may be formed in the usual way or in any desired manner but the mold is bottomless, and within the mold a movable bottom 70 is employed, said movable bottom when in its lower position resting in a recess in the plate 71 upon the table 22, which is concentric with the opening 72 through the plate and table and in alinement with the vertical center line of the mold. The plate 71 has an annular stop or collar 73 surrounding the recess in it and the lower end of the blow mold has an inner annular groove at 74 into which said collar 73 projects when the mold is closed. This both stops and centers the mold.

Since the mold for very large jars is extremely heavy, weighing several hundred pounds, the halves thereof are partially supported by plates 75 mounted on posts 76 extending up from the table 22 and upon which a roller 77 on an arm 78 extending laterally from each half of the mold rides and rolls as the mold is opened and closed.

The movable bottom 70 is supported on a rod 80 which reciprocates vertically through a guide 81 secured to the underside of the table. The lower end of the rod 80 is concave and rests loosely upon the convex upper end of a piston rod 82, which extends through the top 83 of a liquid check cylinder 84. This liquid cylinder is to provide for the slow downward movement of the bottom 70 of the mold and associated parts, under the influence of gravity and also the pressure of air in the bottle 85 as it is being blown. Within the cylinder 84 there is a piston 86 on the rod 82 which has openings 87 through it for the movement of the liquid from the underside to the upper side of the piston as it moves downwardly. There is a plate 88 on the underside of the piston 86 and forming a part thereof and having holes through it corresponding to the holes 87. The piston is recessed to carry a valve plate 90 having openings 91 therethrough adapted to register with the openings 87. The extent of registry of these openings is controlled by the shaft 92 upon the lower end of which the valve 90 is secured. Said shaft is oscillated slightly which brings the openings 91 and 87 into gradual registry as the piston descends so that the openings through the valve plate will be increased as the piston descends. Hence as the blowing of the bottle proceeds, the openings through the piston for the passage of the fluid from the under side to the upper side will increase gradually and thus accelerate the downward movement of the mold bottom and greatly facilitate the process of forming the jar and also improve the quality of the jar.

The valve stem 92 is mounted at its upper end with a bearing piece 94 secured to the head 95 on the piston rod 82. The valve stem 92 is oscillated by the rod 96. The upper end of the rod is secured to the stem 92 and the downward end is inclined and projects loosely through a slot 97 in the plate 98 adjustably mounted by the screws 99 and slots 100 upon the top 83 of the fluid cylinder 84. The inclined portion of the rod 96 is shown in Fig. 10 where the parts are in the position shown in Fig. 9. In Fig. 11 the position is shown when the parts are in the position shown in Fig. 12, the glass article having been fully blown. The extent of inclination of rod 96 and, therefore, of oscillatory movement given to the valve stem 92 and the valve 90 by the rod 96, is predetermined by the position of the plate 98, so that the device may be set to enable one to more rapidly increase the valve openings and, therefore, greatly accelerate the downward movement of the mold bottom or the opposite adjustment be effected.

The fluid cylinder 84 is supported by ears 105 secured to the top thereof, which in turn are secured to the lower ends of rods 106 screwed into and extending down from the table 22. To prevent the piston 86 and stem 82 from turning so as to interfere with the valve opening action of the inclined rod 96, guide arms 107, see Figs. 1 and 10, project from the head 95 out to and behind the rods 106 at each side of the piston rod. By the arms 107 as they move up and down engaging the rods 106, oscillatory movement of the piston rod 82 is prevented.

When the glass blank 110 is placed in the blow mold, the movable bottom 70 must be elevated into the position shown in Fig. 9, and this is done by the roller 111 on the head 95, which is secured to the rod 82 riding upon the stationary inclined track 112. This track is concentric with the center of the machine, see Fig. 6, and is supported from the head 18 on the stationary tubular portion 17. To the underside of the head or flange 18 a bracket 113 is secured and extends downward and at its lower end is vertically slotted at 114 in which a sliding block 115 is located, so that it can be vertically adjusted by the set screw 116. The block 115 has a bolt 117 extending through it, which carries a bracket 118, to the outer arm of which the track is secured at the upper or right-hand end, as shown in Fig. 6. The lower end is pivotally mounted, as shown in Fig. 8, the bracket 113 being at that point much longer than at the other point and not being slotted at the lower end, but having in it a pivot bolt 120 and spacer 121, and the track is pivoted on the outer end of the bolt 120. This enables the upper end of the track to be vertically adjusted so as to raise the mold bottom to the desired elevation. When the mold bottom is thus lifted the desired elevation, it is held by the V-shaped end of the spring-pressed lock bolt 125 entering a V-shaped groove in the block 94. Said lock bolt 125 is mounted in a casing 127, which is secured to the underside of the table 22, and it is spring-pressed by the spring 128 in said casing, the tension of the spring being adjusted by the set screw 129.

This lock will hold the mold elevated until the blank has been put in and the blowing started. As soon as the blowing starts, there will be a slight downward pressure of the blank upon the bottom 70 of the mold, which will be sufficient to automatically disengage the lock bolt 125, and if it is not, then the spring 128 should be adjusted so that such unlocking will automatically result from the pressure of the blowing in the blank.

The machine, including the mold table, is revolved in the direction indicated by the arrow in Fig. 2, and at intervals under the table there are stopblocks 130 secured, see Fig. 3. These blocks are beveled along their advancing surfaces so as to travel over the beveled upper surfaces of the ends of the spring stop pawls 131 and after the block 130 has passed over the pawl 131, the latter drops in behind the block 130 and prevents any backward movement. The stop pawl 131 is peculiarly formed, mounted and raised. To the periphery of the top flange 18 of the tubular portion 17 an angle bracket 135 is secured, having a vertical portion through which the screw 136 of a sleeve 137 is secured by a nut 138, so that said sleeve will be oscillatory. The pawl 131 extends loosely through said sleeve and is yieldingly mounted thereon by the spring 140, which is arranged about the pawl 131 and lies against the sleeve 137 and the collar 141. This furnishes a yielding means for resisting backward movement of the machine. The free end of the pawl is held up against the underside of the mold table 122 by the spring 143 which at one end is secured to the lower end of the pawl 131 and the other end is coiled and secured to the sleeve 127 by a screw 144.

The operation of the machine is as follows: It is rotated until the mold bottom has been elevated, as seen at the middle of Fig. 1. Then the glass blank is placed in the blow mold by the lift-over and the mold closed. Upon the slight further revolving movement of the machine the air valve is actuated, letting air into the upper part of the cylinder 40 and moving the blow-head down upon the lift-over, and then air passes therethrough into the blank. At that time the machine is moved far enough to the right from the position shown in Fig. 1 that the roller 111 is moved away from the upper end of the track 112. Then the air entering the blank first spreads out the upper part thereof and begins pressing down upon the bottom. That disengages the lock 125 so as to permit the bottom of the mold to descend. The knob 79 on the top of the mold bottom centers the lower end of the blank so that an equal distribution in all directions of the glass ensues. The liquid in the tank 84 at first renders the downward movement of the mold bottom slow, but as the blowing process continues, the rod 96 gradually opens the ports 91 in the piston, and, therefore, gradually facilitates the passage of the liquid from the underside to the upper end of the piston and correspondingly accelerates the downward movement of the mold bottom. This continues until the mold bottom is seated and the large glass article fully formed. The mold is then opened, the plates 75 supporting the halves thereof during the opening movement. As the revolution continues the mold again comes around to the track 112 and again the roller 111 rides upon said track and lifts the mold bottom. As that happens the liquid above the piston 86 rapidly passes through the mold through a large spring-closed check valve 151. When the mold bottom has reached its upward limit of movement, the lock 125 again catches the block 124 and holds it in its upward position. During the upward movement the inclined rod 96 closes the port 91 in the piston.

I claim as my invention:

1. A glass blowing machine including a blow mold, a separate bottom therein, one of said members being movable vertically relative to the other, a movable table on which said members are carried, means for positively elevating said movable member to a predetermined position, and means releasable by the blowing pressure on said movable member for temporarily holding the same in its elevated position.

2. A glass blowing machine including a blow mold, means for inserting and supporting a glass blank therein, a movable bottom in said blow mold, means for elevating the same to a point near the lower end of the glass blank so that the blank will settle by gravity into contact with said movable bottom, means for introducing air into the glass blank for blowing the same, means releasable by the blowing pressure on the movable bottom for maintaining the movable bottom in its elevated position until the glass blank has been blown laterally against the wall of the mold, and means for controlling the lowering of the bottom thereafter until it reaches the lower part of the mold.

3. A glass blowing machine including a rotatable table, a blow mold thereon, a movable bottom therein, fixed means for elevating said movable bottom to a predetermined position in the blow mold, spring controlled means for supporting said movable bottom in its elevated position, and means for yieldingly resisting the downward movement of the movable bottom after it has been released by said holding means.

4. A glass blowing machine including a rotatable table, a blow mold thereon, a movable bottom in said blow mold, means for elevating said movable bottom to a predetermined position in the blow mold, means carried by the table and releasable by the blowing pressure on the movable bottom for supporting the movable bottom in its elevated position, and means carried by the table for yieldingly resisting the downward movement of the movable bottom.

5. A glass blowing machine including a blow mold, a separate bottom therein, one of said members being movable vertically relative to the other, a movable table on which said members are carried, an upwardly inclined stationary track, means moved by the table and which travels on said track for elevating said movable member, means releasable by the blowing pressure on said movable member for supporting the same in its elevated position, and means for yieldingly resisting the return movement of said movable member.

6. A glass blowing machine including a blow mold, a separate bottom therein, one of said members being movable vertically relative to the other, a movable table on which said members are carried, an upwardly inclined stationary track, means moved by the table and which travels on said track for elevating said movable member, and means releasable by the blowing pressure on the blow bottom for temporarily maintaining said movable member in its elevated position after it has left said track.

7. A glass blowing machine including a blow mold, a separate bottom therein, one of said members being movable vertically relative to the other, a movable table on which said members are carried, an upwardly inclined stationary track, means moved by the table which travels on said track for elevating said movable member, means for maintaining said movable member in its elevated position after it leaves said track, and a spring for controlling said holding means adapted to be overcome by the blowing pressure on the mold bottom.

8. A glass blowing machine including a movable table, a blow mold carried thereby, a movable bottom in the blow mold, means extending below the table for supporting said movable bottom, means carried by the table for resisting the downward movement of said movable bottom, an inclined stationary track below the table and on a higher level than said yieldingly resisting means, and means on said bottom supporting means for traveling on said track as the table moves and thus elevating the movable bottom to a predetermined position in the mold.

9. A glass blowing machine including a movable table, a blow mold carried thereby, a movable bottom in the blow mold, means extending below the table for supporting said movable bottom, means carried by the table for resisting the downward movement of said movable bottom, an inclined stationary track below and in fixed relation with the table and on a higher level than said yieldingly resisting means, and means carried by said table on a higher level than said track for releasably holding said bottom supporting means in an elevated position.

10. A glass blowing machine including a movable table, a blow mold carried thereby, a movable bottom in the blow mold, means extending below the table for supporting said movable bottom, means carried by the table for resisting the downward movement of said movable bottom, an inclined stationary track below in fixed relation with the table and on a higher level than said yieldingly resisting means, and means secured to the underside of the table for guiding said bottom supporting means.

11. A glass blowing machine including a blow mold, a separate bottom therein, one of said members being movable vertically relative to the other, a movable table carrying said members, a fluid cylinder carried by said table, a piston in said cylinder with a port therethrough whereby fluid will pass slowly from one side to the other of said piston, means carried by said piston for controlling the movement of said movable member and means for elevating said movable mold bottom.

12. A glass blowing machine including a rotatable table, blow molds mounted thereon, a movable bottom for each blow mold, a pair of rods extending down from said table under each blow mold, a fluid cylinder carried by said rods, a piston in said cylinder with a port therethrough whereby fluid will pass slowly from the underside to the upper side thereof, means carried by said piston for supporting the mold bottom, and means for elevating said movable mold bottom.

13. A glass blowing machine including a rotatable table, blow molds mounted thereon, a movable bottom for each blow mold, a pair of rods extending down from said table under each blow mold, a fluid cylinder carried by said rods, a piston in said cylinder with a port therethrough whereby fluid will pass slowly from the underside to the upper side thereof, a rod extending from said piston through the top of the fluid cylinder, a rod extending from said mold bottom and resting upon and interlocking with the upper end of said piston rod, means connected with said table for guiding said mold bottom rod, and means for elevating said piston rod.

14. A glass blowing machine including a rotatable table, blow molds mounted thereon, a vertically movable bottom for each of said blow molds, a fluid cylinder under each blow mold, means extending down from the table for supporting said cylinder, a piston in said cylinder, a rod extending up from said piston for supporting the movable bottom, an arm extending laterally from said rod and carrying a roller at a point between the table and said cylinder, and a stationary inclined track adapted to be engaged by said roller as the table revolves.

15. A glass blowing machine including a rotatable mold table, blow molds thereon, a movable bottom for each blow mold, means for supporting said mold bottom which means extends down through the table, an inclined stationary track with which said mold bottom supporting means comes in contact during the rotary movement of the table for elevating said mold bottom, and means connected with the table and releasable by the blowing pressure for holding the mold bottom supporting means in elevated position after it leaves the track.

16. A glass blowing machine including a rotatable mold table, blow molds thereon, a movable bottom for each blow mold, a rod for supporting said mold bottom, a roller mounted in connection with said rod at the side thereof, an inclined stationary track adapted to be engaged by said roller for elevating the mold bottom as the table rotates, a block secured to said mold bottom supporting rod and having a notch in its outer end with a beveled surface above the notch, a casing secured to the underside of the table, and a spring-pressed locking bolt in said casing with its outer end beveled so that as the mold bottom supporting means moves upwardly to the limit of movement said block will be engaged by said locking bolt and when air is introduced in the blow mold the downward pressure on the mold bottom supporting means will disengage said block from said locking bolt.

17. A glass blowing machine including a rotatable mold table, blow molds thereon, a movable bottom for each blow mold, a rod for supporting said mold bottom, a roller mounted in connection with said rod at the side thereof, an inclined stationary track adapted to be engaged by said roller as the table revolves for elevating the mold bottom, a block secured to said mold bottom supporting rod having a notch in its outer end with a beveled surface above the notch, a casing secured to the underside of the table, a spring-pressed locking bolt in said casing with its outer end beveled so that as the mold bottom supporting means moves upwardly to the limit of movement said block will be engaged by said locking bolt and when air is introduced in the blow mold the downward pressure on the mold bottom supporting means will disengage said block from said locking bolt, a rod secured to the mold table and extending downwardly therefrom on each side of the mold bottom supporting rod, and laterally extending arms secured to the mold bottom supporting rod with their outer ends in sliding engagement with said fixed rods secured to the mold table for preventing the turning of the mold bottom supporting rods.

18. A glass blowing machine including a blow mold, a separate bottom therein, one of said members being vertically movable relative to the other, a rotatable table for carrying said members, a fixed upwardly inclined track below said table, means moved by said table and adapted to travel on said track for elevating said movable member, and means for engaging said traveling means when it reaches the highest elevation of said track and releasably supporting the same.

19. A glass blowing machine including a blow mold, a separate bottom therein, one of said members being vertically movable relative to the other, a rotatable table for carrying said members, a fixed upwardly inclined track below said table, means moved by said table and adapted to travel on said track for elevating said movable member, and spring actuated means for engaging said traveling means when it reaches the highest elevation of said track and releasably supporting the same.

20. A glass blowing machine including a blow mold, a separate bottom therein, one of said members being vertically movable relative to the other, a rotatable table for carrying said members, a fixed upwardly inclined track below said table, means moved by said table and adapted to travel on said track for elevating said movable member, and means for engaging and supporting said traveling means when it reaches the highest elevation on said track and releasable by the blowing pressure on the movable bottom.

In witness whereof, I have hereunto affixed my signature in the presence of the witnesses herein named.

JOHN RAU.

Witnesses:
E. H. MAYO,
O. M. McLAUGHLIN.